United States Patent
Benisty et al.

(10) Patent No.: US 10,642,496 B2
(45) Date of Patent: May 5, 2020

(54) OUT OF ORDER READ TRANSFER WITH HOST MEMORY BUFFER

(71) Applicant: SanDisk Technologies Inc., Plano, TX (US)

(72) Inventors: Shay Benisty, Beer Sheva (IL); Tal Sharifie, Lehavim (IL)

(73) Assignee: SanDisk Technologies Inc., Plano, TX (US)

(*) Notice: Subject to any disclaimer, the term of this patent is extended or adjusted under 35 U.S.C. 154(b) by 247 days.

(21) Appl. No.: 15/088,692

(22) Filed: Apr. 1, 2016

(65) Prior Publication Data
US 2017/0285940 A1 Oct. 5, 2017

(51) Int. Cl.
G06F 3/06 (2006.01)
G06F 12/02 (2006.01)
G06F 12/0871 (2016.01)

(52) U.S. Cl.
CPC .............. G06F 3/061 (2013.01); G06F 3/067 (2013.01); G06F 3/0656 (2013.01); G06F 3/0659 (2013.01); G06F 3/0685 (2013.01); G06F 3/0688 (2013.01); G06F 12/0246 (2013.01); G06F 12/0871 (2013.01)

(58) Field of Classification Search
CPC ....... G06F 3/061; G06F 3/0659; G06F 3/0688
See application file for complete search history.

(56) References Cited

U.S. PATENT DOCUMENTS

| | | | | |
|---|---|---|---|---|
| 5,283,880 A * | 2/1994 | Marcias-Garza | ... | G06F 12/0802 711/118 |
| 6,167,551 A * | 12/2000 | Nguyen | ... | G11B 20/00 714/770 |
| 6,598,143 B1 * | 7/2003 | Baker | ... | G06F 12/023 707/999.202 |
| 6,640,269 B1 * | 10/2003 | Stewart | ... | G06F 9/544 707/E17.01 |
| 6,651,113 B1 * | 11/2003 | Grimsrud | ... | G06F 3/0613 710/22 |
| 6,745,283 B1 | 6/2004 | Dang | | |
| 6,882,440 B1 * | 4/2005 | Nitta | ... | H04N 1/3875 358/1.16 |
| 7,307,998 B1 * | 12/2007 | Wang | ... | H04L 49/90 370/412 |
| 7,738,451 B2 * | 6/2010 | Chien | ... | H04L 49/90 370/381 |

(Continued)

OTHER PUBLICATIONS

International Search Report and Written Opinion dated Jun. 20, 2017 for PCT Application No. PCT/2017/019397 (19 pp.).

(Continued)

Primary Examiner — Mano Padmanabhan
Assistant Examiner — Andrew J Cheong
(74) Attorney, Agent, or Firm — Brinks Gilson & Lione

(57) ABSTRACT

A storage device may utilize a host memory buffer for re-ordering commands in a submission queue. Out of order commands in a submission queue that uses host virtual buffers that are not the same size may be difficult to search. Accordingly, commands in a submission queue may be correctly ordered in a host memory buffer before being put into the host virtual buffers. When the commands are in order, the search operation for specific data is improved.

20 Claims, 8 Drawing Sheets

(56) References Cited

U.S. PATENT DOCUMENTS

| | | | |
|---|---|---|---|
| 2004/0268017 A1* | 12/2004 | Uzrad-Nali | H04L 29/06 711/1 |
| 2006/0203570 A1 | 9/2006 | Meier et al. | |
| 2009/0055580 A1* | 2/2009 | Moscibroda | G06F 13/1642 711/104 |
| 2010/0250836 A1* | 9/2010 | Sokolov | G06F 12/0246 711/103 |
| 2011/0295916 A1* | 12/2011 | Nichols | G06F 11/3684 707/822 |
| 2011/0296088 A1* | 12/2011 | Duzly | G06F 12/0246 711/103 |
| 2013/0262745 A1 | 10/2013 | Lin et al. | |
| 2014/0281136 A1 | 9/2014 | Wakrat et al. | |
| 2015/0012717 A1* | 1/2015 | Murphy | G11C 7/22 711/167 |
| 2015/0134855 A1* | 5/2015 | Sheffield | G06F 3/0638 710/4 |
| 2016/0026406 A1 | 1/2016 | Hahn et al. | |
| 2016/0062669 A1 | 3/2016 | Chu et al. | |
| 2016/0246726 A1* | 8/2016 | Hahn | G06F 12/0862 |
| 2017/0060422 A1* | 3/2017 | Sharifie | G06F 3/0604 |
| 2017/0097909 A1* | 4/2017 | Simionescu | G06F 13/28 |

OTHER PUBLICATIONS

Dorgelo et al., "Host Memory Buffer (HMB) Based SSD System," Forum J-31: PCIe/NVMe Storage, XP055374990, Aug. 13, 2015 (16 pp.), https://www.flashmemorysumit.com/English/Collaterals/Proceedings/2015/20150813_FJ31_Chen_Dorgello.pdf.

Internet article, "Serial ATA Native Command Queuing an Exciting New Performance Feature for Serial ATA," XP055375991, Jul. 2, 2003 (12 pp), http://www.seagate.com/docs/pdf/whitepaper/D2c_tech_paper_intc-stx_sata_ncq.pdf.

Internet article, "NVM Express 1.2," XP055375092, Nov. 3, 2014, (205 pp.), http://nvmexpress.org/wp-content/uploads/NVM_Express_1_2_Gold_20141209.pdf.

Schoenecker, Don, Keysight Technologies, "PCIE Protocol Analyhsis for SSDs," DesignCon 2015 (62 pp.) [submitted to USPTO in two parts].

Article, "NVM Express Explained," 2013 (5 pp.), http://www.nvmexpress.org/wp-content/uploads/2013/04/NVM_whitepaper.pdf.

Marks, Kevin, "An NVM Express Tutorial," Flash Memory Summit 2013, Santa Clara, California (92 pp.), https://www.flashmemorysummit.com/English/Collaterals/Proceedings/2013/20130812_PreConfD_Marks.pdf [submitted to USPTO in two parts].

Article, "NVM Express 1.1," Oct. 11, 2012 (163 pp.), http://nvmexpress.org/wp-content/uploads/2013/05/NVM_Express_1_1.pdf [submitted to USPTO in two parts].

Onufryk, Peter, Director of Engineering, IDT, NVM Express, How the Streamlined Architecture of NVM Express Enables High Performance PCIe SSDs, 2012 (16 pp.), http://www.nvmexpress.org/wp-content/uploads/2013/04/FMS-2012-How-the-Streamlined-Architecture-of-NVM-Express-Enables-High-Performance-PCIe-SSDs.pdf.

* cited by examiner

Figure 6

| Code | Descriptor Type |
|---|---|
| 0h | SGL Data Block |
| 1h | SGL Bit Bucket |
| 2h | SGL Segment |
| 3h | SGL Last Segment |
| 4h – Eh | Reserved |
| Fh | Vendor Specific |

US 10,642,496 B2

OUT OF ORDER READ TRANSFER WITH HOST MEMORY BUFFER

TECHNICAL FIELD

This application relates generally to memory devices. More specifically, this application relates to handling of command queues and data transfers of the memory device.

BACKGROUND

Non-volatile memory systems, such as flash memory, have been widely adopted for use in consumer products. Flash memory may be found in different forms, for example in the form of a portable memory card that can be carried between host devices or as a solid state disk (SSD) embedded in a host device. The flash device controller receives commands, such as read commands, from a host. The commands may include admin (e.g. commands for device configuration and maintenance) as well as operation commands (e.g. commands for accessing the NAND media including erase, write and read commands). There may be a submission queue for submitted commands and a command queue for commands waiting for execution. Complex protocols such as Non-Volatile Memory Express (NVMe) may provide specific queuing mechanisms in order to deliver optimal performance. However, these mechanisms may cause inefficiencies depending on the protocols used. For example, data that is out of order in pending commands may be difficult to search/access when using a scatter gather list (SGL) mechanism. Due to a demand in higher performance storage is coming from a various range of applications such as cloud computing, high performance computing and video broadcasting, there is a need for improved command handling and data transfer.

SUMMARY

A storage device may utilize a host memory buffer for re-ordering commands in a submission queue. Out of order commands in a submission queue that uses host virtual buffers that are not the same size may be difficult to search. Accordingly, commands in a submission queue may be correctly ordered in a host memory buffer before being put into the host virtual buffers. When the commands are in order, the search operation for specific data is improved.

In an embodiment, a data transfer in a memory device may include receiving one or more read commands from a host. A host memory buffer is dynamically allocated for the received read commands. A size of the allocated host memory buffer is based on a transfer size of the read commands. Data associated with the read commands is stored in the host memory buffer in order. The stored data is written from the host memory buffer to a host buffer allocated by the host, wherein the host buffer is distinct from the host memory buffer. The stored data may be transferred to a plurality of host buffers of different sizes. The host buffer and the host memory buffer are stored in memory of the host. Physical memory locations in host memory is based on a scatter gather list (SGL). The SGL list comprises a plurality of segments, each of which comprises a pointer to a subsequent segment. The storing of the data in the host memory buffer includes storing an appropriate offset in the allocated host memory buffer. Each of the segments comprises descriptors that include a pointer to one of the host buffers allocated by the host and an indication of the size of that buffer. Read commands received from the host include data that is out of order and data in the host memory buffer is re-ordered while in the host memory buffer.

BRIEF DESCRIPTION OF THE DRAWINGS

FIG. 6 illustrates exemplary types of exemplary SGL descriptors.

DESCRIPTION OF THE EMBODIMENTS

The host memory buffer (HMB) may be a portion of host memory that is allocated for the memory device's use. In particular, the memory device can use the HMB on the host for any data storage. As described herein, a data transfer of out of order data may be temporarily stored in the HMB where it is re-ordered before proceeding to the originally allocated buffers. In other words, the HMB may be an intermediate storage between the memory device and the original host buffers at which the data can be ordered. Without the temporary storage in the HMB, the data being transferred to the originally allocated buffers would be out of order. Out of order data may create inefficiencies in searching with a scatter gather list (SGL) arrangement due to the host buffers being different sizes. Ordered data in the different sized host buffers may be more efficiently accessed.

Figure 1A:
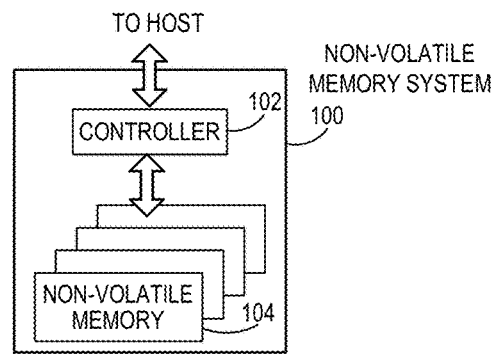
FIG. 1A is a block diagram of an example non-volatile memory system.

FIGS. 1A-2B are exemplary memory systems which may implement the storage and re-ordering of data in the host memory buffer before transfer to the originally allocated host buffers. FIG. 1A is a block diagram illustrating a non-volatile memory system. The non-volatile memory system 100 includes a controller 102 and non-volatile memory that may be made up of one or more non-volatile memory die 104. As used herein, the term die refers to the set of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104. The non-volatile memory die 104 may store an operating system for the host.

Examples of host systems include, but are not limited to, personal computers (PCs), such as desktop or laptop and other portable computers, tablets, mobile devices, cellular telephones, smartphones, personal digital assistants (PDAs), gaming devices, digital still cameras, digital movie cameras, and portable media players. For portable memory card applications, a host may include a built-in receptacle for one or more types of memory cards or flash drives, or a host may require adapters into which a memory card is plugged. The memory system may include its own memory controller and drivers but there may also be some memory-only systems that are instead controlled by software executed by the host to which the memory is connected. In some memory systems containing the controller, especially those embedded within a host, the memory, controller and drivers are often formed on a single integrated circuit chip. The host may communicate with the memory card using any communication protocol such as but not limited to Secure Digital (SD) protocol, Memory Stick (MS) protocol and Universal Serial Bus (USB) protocol.

The controller 102 (which may be a flash memory controller or device controller) can take the form of processing circuitry, a microprocessor or processor, and a computer-readable medium that stores computer-readable program code (e.g., software or firmware) executable by the (micro) processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a flash memory controller is a device that manages data stored on flash memory and communicates with a host, such as a computer or electronic device. A flash memory controller can have various functionality in addition to the specific functionality described herein. For example, the flash memory controller can format the flash memory to ensure the memory is operating properly, map out bad flash memory cells, and allocate spare cells to be substituted for future failed cells. Some part of the spare cells can be used to hold firmware to operate the flash memory controller and implement other features. In operation, when a host needs to read data from or write data to the flash memory, it will communicate with the flash memory controller. If the host provides a logical address to which data is to be read/written, the flash memory controller can convert the logical address received from the host to a physical address in the flash memory. (Alternatively, the host can provide the physical address). The flash memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface. In one embodiment, memory system 100 may be part of an embedded memory system. For example, the flash memory may be embedded within the host, such as in the form of a solid state disk (SSD) drive installed in a personal computer. In another embodiment, memory system 100 may be a card based system, such as a secure digital (SD) or a micro secure digital (micro-SD) card.

Although in the example illustrated in FIG. 1A, non-volatile memory system 100 includes a single channel between controller 102 and non-volatile memory die 104, the subject matter described herein is not limited to having a single memory channel. For example, in some NAND memory system architectures, such as in FIGS. 1B and 1C, 2, 4, 8 or more NAND channels may exist between the controller and the NAND memory device, depending on controller capabilities. In any of the embodiments described herein, more than a single channel may exist between the controller and the memory die, even if a single channel is shown in the drawings.

Figure 1B:
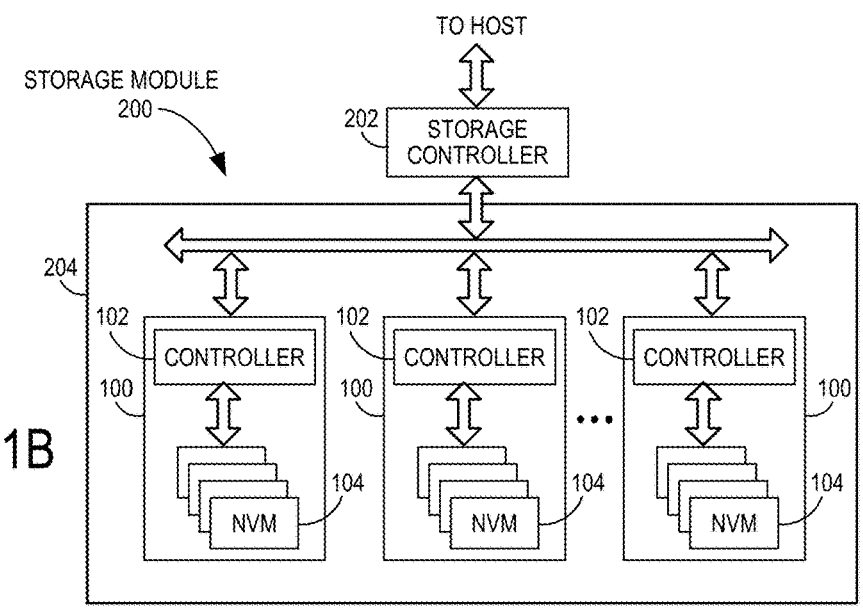
FIG. 1B is a block diagram of a storage module that includes a plurality of non-volatile memory systems.

FIG. 1B illustrates a storage module 200 that includes plural non-volatile memory systems 100. As such, storage module 200 may include a storage controller 202 that interfaces with a host and with storage system 204, which includes a plurality of non-volatile memory systems 100. The interface between storage controller 202 and non-volatile memory systems 100 may be a bus interface, such as a serial advanced technology attachment (SATA) or peripheral component interface express (PCIe) interface. Storage module 200, in one embodiment, may be a solid state drive (SSD), such as found in portable computing devices, such as laptop computers, and tablet computers.

Figure 1C:
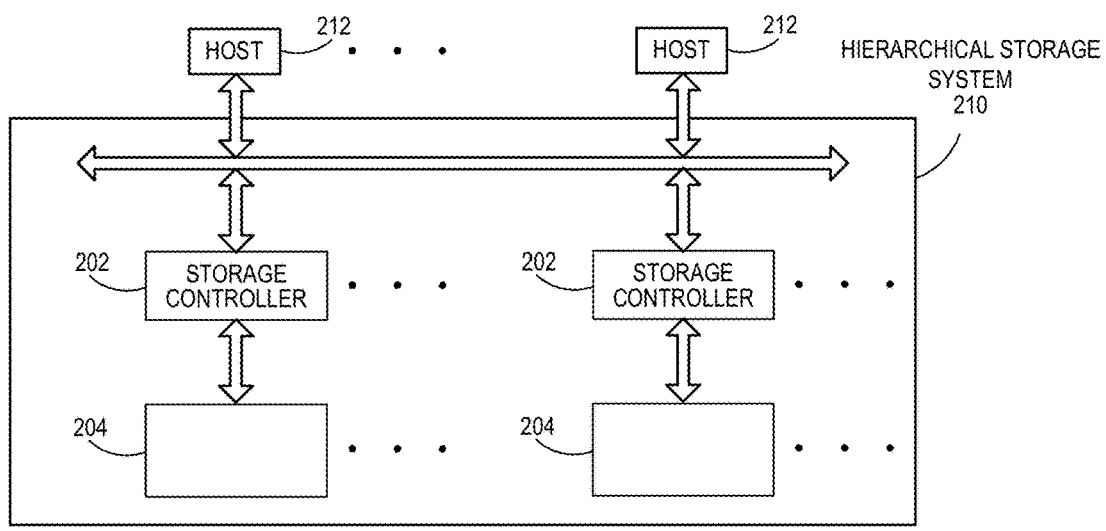
FIG. 1C is a block diagram of a hierarchical storage system.

FIG. 1C is a block diagram illustrating a hierarchical storage system. A hierarchical storage system 210 includes a plurality of storage controllers 202, each of which control a respective storage system 204. Host systems 212 may access memories within the hierarchical storage system via a bus interface. In one embodiment, the bus interface may be a non-volatile memory express (NVMe) or a fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
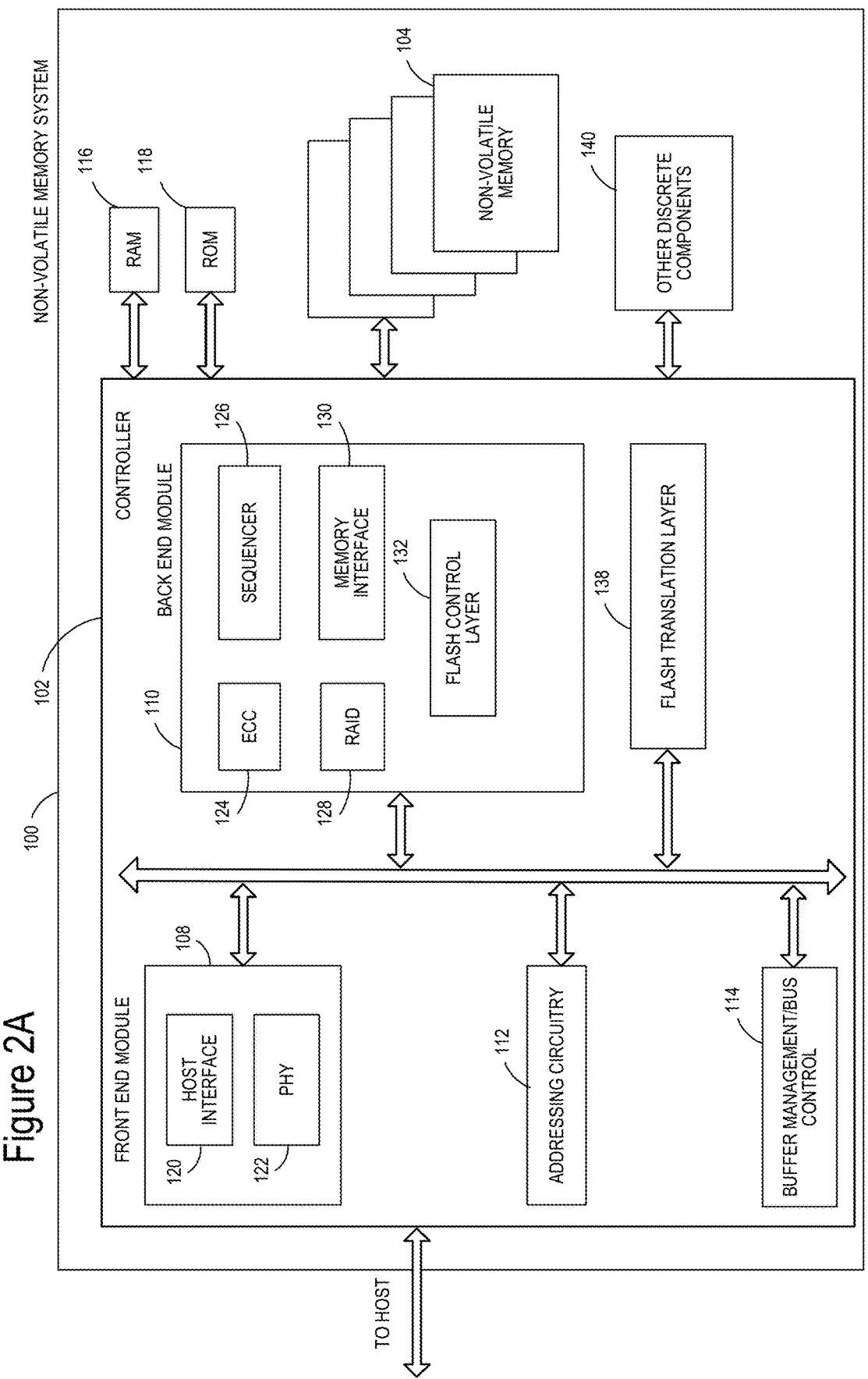
FIG. 2A is a block diagram of exemplary components of a controller of a non-volatile memory system.

FIG. 2A is a block diagram illustrating exemplary components of controller 102 in more detail. Controller 102 includes a front end module 108 that interfaces with a host, a back end module 110 that interfaces with the one or more non-volatile memory die 104, and various other modules that perform functions which will now be described in detail. The front end module 108 may communicate with the host (e.g. with the HMB).

A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. For example, each module may include an application specific integrated circuit (ASIC), a Field Programmable Gate Array (FPGA), a circuit, a digital logic circuit, an analog circuit, a combination of discrete circuits, gates, or any other type of hardware or combination thereof. Alternatively or in addition, each module may include memory hardware, such as a portion of the memory 104, for example, that comprises instructions executable with a processor to implement one or more of the features of the module. When any one of the modules includes the portion of the memory that comprises instructions executable with the processor, the module may or may not include the processor. In some examples, each module may just be the portion of the memory 104 or other physical memory that comprises instructions executable with the processor to implement the features of the corresponding module.

The controller 102 may include addressing circuitry 112. The addressing circuitry 112 may utilize the HMB from the host for temporary storage of data that can be re-ordered before transfer to the previously allocated host buffers. In one embodiment, the addressing circuitry 112 may be a part of the host interface 120 and/or the front end module 108. In another embodiment, the addressing circuitry 112 may be a part of the queueing of commands that precede a data transfer. The process is further described below with respect to FIG. 7.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller. Further, in some implementations, the controller 102, RAM 116, and ROM 118 may be located on separate semiconductor die.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, SAS, Fibre Channel, USB, PCIe, and NVMe. The host interface 120 typically facilitates transfer for data, control signals, and timing signals. As described herein, the data transfer to the HMB of the host may be facilitated through the host interface 120.

Back end module 110 includes an error correction controller (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the non-volatile memory system 100. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface. A flash control layer 132 controls the overall operation of back end module 110.

Additional components of system 100 illustrated in FIG. 2A include flash translation layer ("FTL") 138, which performs wear leveling of memory cells of non-volatile memory die 104. System 100 also includes other discrete components 140, such as external electrical interfaces, external RAM, resistors, capacitors, or other components that may interface with controller 102. In alternative embodiments, one or more of the physical layer interface 122, RAID module 128, and buffer management/bus controller 114 are optional components that are not necessary in the controller 102.

The FTL 138 may also be referred to as a Media Management Layer ("MML"). The FTL 138 may be integrated as part of the flash management or flash control layer 132 that may handle flash errors and interfacing with the host. In particular, FTL may be circuitry responsible for the internals of NAND management. In particular, the FTL 138 may include functionality or an algorithm in the memory device firmware which translates reads/writes from the host into reads/writes to the flash memory 104. The FTL 138 may receive commands (or access a queue of commands) for execution (e.g. programming to the non-volatile memory 104 or reading from the non-volatile memory 104). By accessing a queue of the commands, the FTL 138 can optimally and efficiently select when and how to execute commands from the queue. In one example, the FTL 138 may group commands to increase the efficiency with which the non-volatile memory 104 is accessed.

The command queue at the back end (e.g. back end module 110, FTL 138, or addressing circuitry 112) of the non-volatile memory system 100 may include all commands from the front end (e.g. front end module 108) queue. When the commands include data that is out of order, the data may be transferred to the HMB of the host for re-ordering.

Figure 2B:
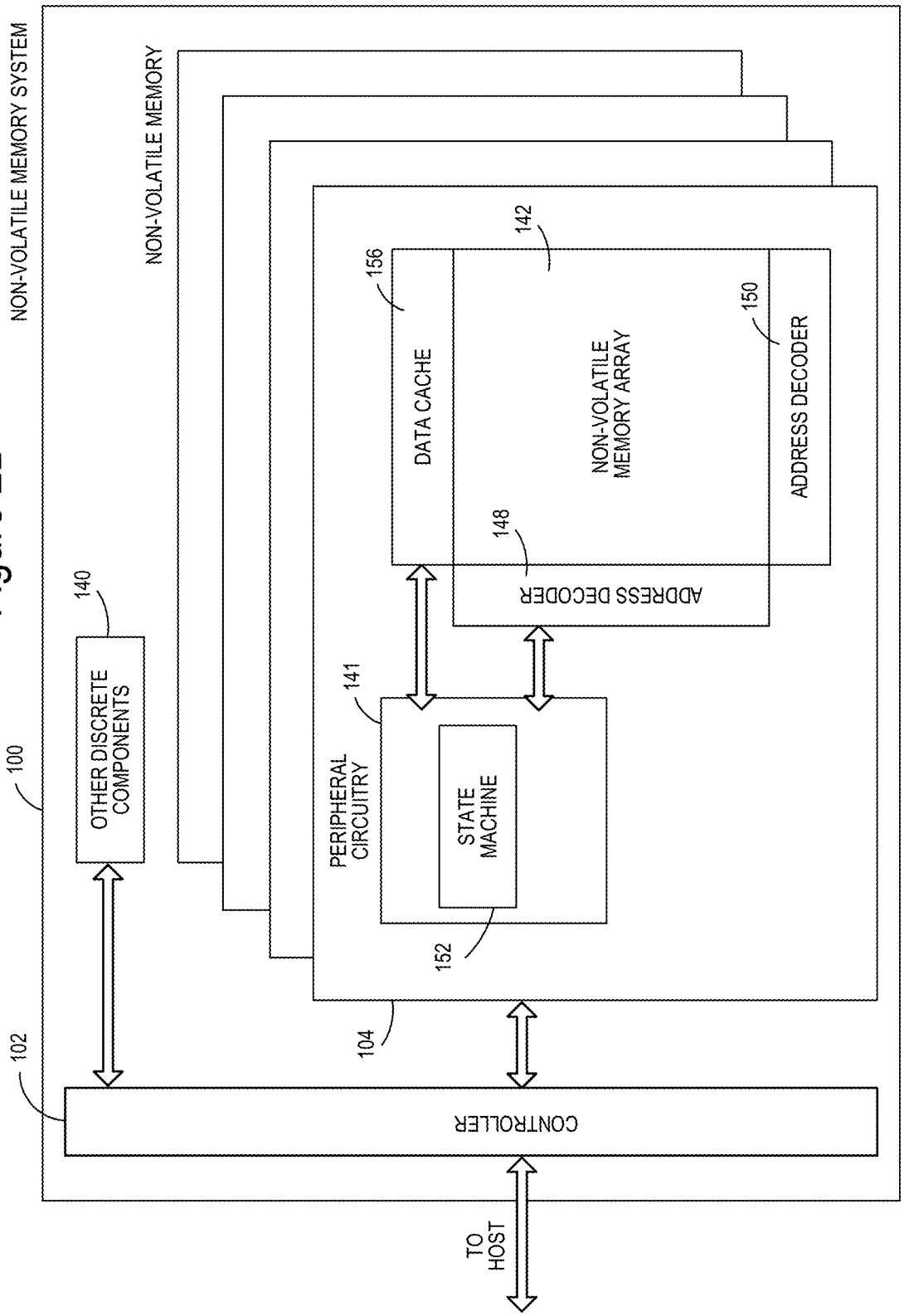
FIG. 2B is a block diagram of exemplary components of a non-volatile memory of a non-volatile memory storage system.

FIG. 2B is a block diagram illustrating exemplary components of non-volatile memory die 104 in more detail. Non-volatile memory die 104 includes peripheral circuitry 141 and non-volatile memory array 142. Non-volatile memory array 142 includes the non-volatile memory cells used to store data and may be arranged in planes. In one embodiment, each non-volatile memory die 104 may include one or more planes. The non-volatile memory cells may be any suitable non-volatile memory cells, including NAND flash memory cells and/or NOR flash memory cells in a two dimensional and/or three dimensional configuration. Peripheral circuitry 141 includes a state machine 152 that provides status information to controller 102. Non-volatile memory die 104 further includes a data cache 156 that caches data. Exemplary peripheral circuitry 141 may include clocks, pumps, ESD, current shunt, current sink, and/or closely-packed logic circuits.

Figure 3:
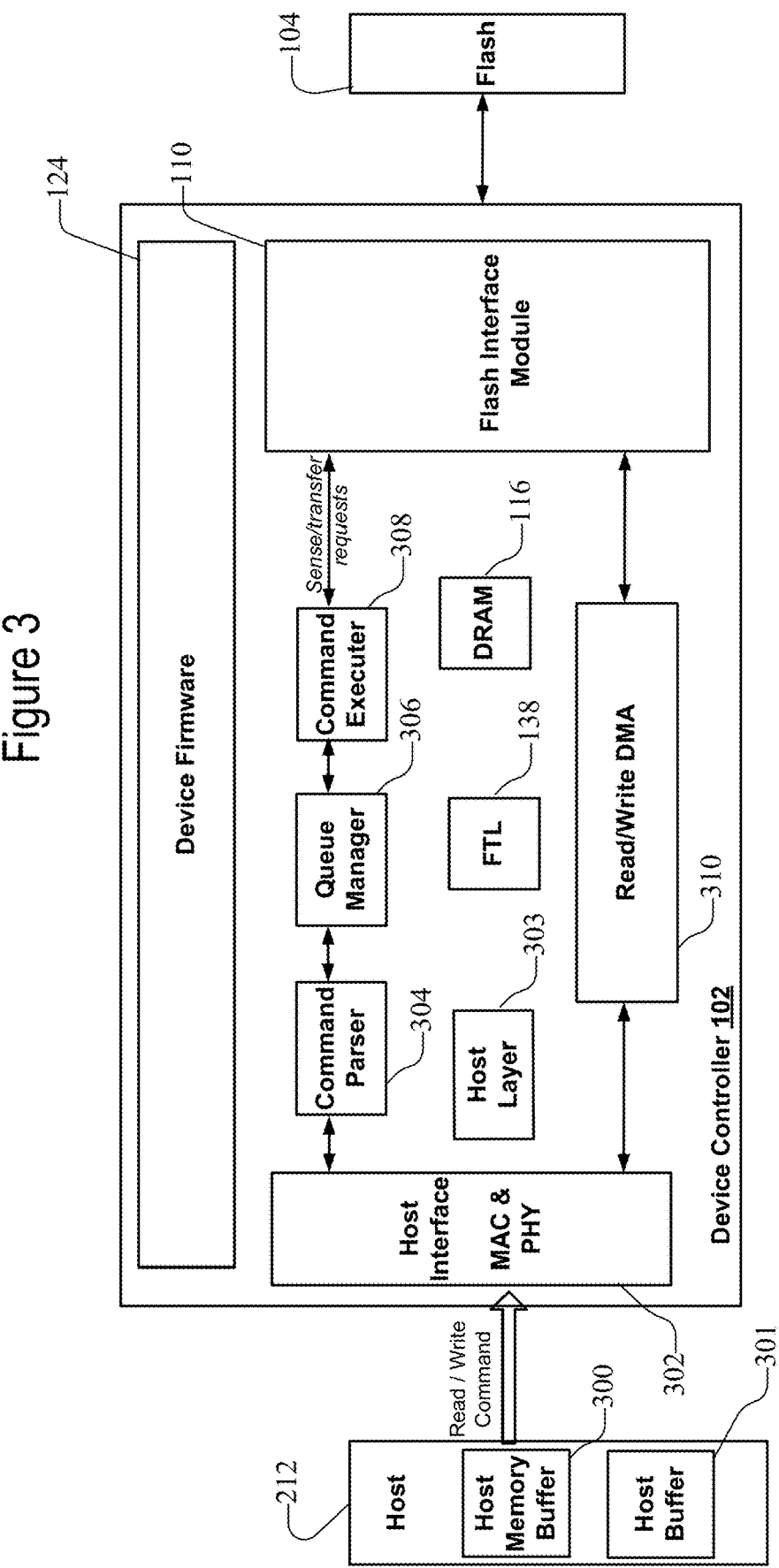
FIG. 3 is a block diagram of a flash device controller.

FIG. 3 may be a portion of FIG. 1 or may illustrate an alternative embodiment. FIG. 3 illustrates an embodiment of the device controller 102, its internal block and their interactions. The host 212 sends commands to the device controller 102 using a physical interface which connects the host to the memory device controller 102. There are many protocols defined in the industry for this interface such as Peripheral Component Interconnect Express (PCIe), SATA and etc. The host interface (MAC and PHY) 302 may implement three low protocol layers (Transaction layer, Data Link layer and Physical layer). The responsibility for the host interface 302 may be to make sure that packets are transferred between the host 212 and the memory device controller 102 without the errors defined in those layers. The memory may be flash memory or NAND memory in one embodiment.

The host 212 may include a host memory buffer (HMB) 300 and host buffers 301. The host buffers 301 may be a plurality of virtual memory locations that are originally allocated for a data transfer with the host as compared with the HMB 300 that is an intermediate storage for the data. The HMB 300 may be a part of the random access memory (RAM) (e.g. DRAM) of the host 212. The host memory buffer 300 may be a buffer that is allocated for usage by the device controller 102 that is distinct from the host buffers that are typically allocated for a data transfer. In other words, the device controller 102 accesses the host 212 memory. As further described below, the host memory buffer 300 may be used as a temporary storage of data to be transferred. The temporary storage may be used as a way to re-order out-of-order data for more efficient operations.

The HMB 300 is a buffer allocated for the memory device controller use at the host memory. It may be host memory (in addition to the allocated host buffers) that is accessible for the memory device controller's exclusive use. The host guarantees that the data will be valid and is obliged to notify the controller before any operation which might cause data loss (power loss, host might need this buffer, etc. . . . ). The host must let the controller acknowledge this operation before the data is lost. In one embodiment, NVMe specifies the requirements for the HMB, which state that the HMB is allocated for controller's exclusive use and the data is guaranteed to be valid.

The command parser 304 receives the operation as well as the admin host commands, parses them and checks the correctness of the host commands. It may interact with the queue manager 306 in order to queue the commands to the appropriate queue. Before executions, host commands may be pending with the queue manager 306. The queue manager may include an arbitration mechanism for prioritizing commands to be executed by the command executor 308. The FTL 138 may optimize the commands in the queue. There may be numerous read and write accesses simultaneously (listed in a command queue), which may require management through an arbitration or optimization mechanism provided by the queue manager 306. The arbitration mechanism may be used to determine priority of commands in the queue for ensuring that high priority commands are queued for execution before lower priority commands. The command parser 304 or the queue manager 306 may be responsible for controlling the flow of data between the controller and the device by ordering requests or commands in the queue. The order may be based on priority of the request, availability of resources to handle the request, an address need for the request, age of the request, or access history of the requestor.

A command queue may be a queue for enabling the delay of command execution, either in order of priority, on a first-in first-out basis, or in any other order. Instead of waiting for each command to be executed before sending the next one, the program just puts the commands in the queue and can perform other processes while the queue is executed. A queue may be used to control the flow of data between the controller and the device. Commands may be placed in the command queue and ordered by the queue manager 306. The order may be based on priority of the request, availability of resources to handle the request, an address need for the request, age of the request, or access history of the requestor. The command queue may be accessible by the FTL 138 for execution. Although not shown in FIG. 3, the command parser 304, queue manager 306, and the command executer 308 may be a part of the host interface module (HIM), such as the host interface 120 shown in FIG. 2A which is part of the front end 108. The host interface 302 may include or be coupled with a host layer 303 for transferring commands from the host 212. The HIM may include the Host Interface MAC & PHY 302. Alternatively, the queue manager 306 may be part of the memory back end (e.g. flash interface module 110).

Command executer 308 may be a part of the FTL 138 that is responsible for command selection and execution. Pending commands may be arbitrated by the queue manager 306 to select the next command for execution by sending sense and transfer requests to the flash interface module ("FIM") 110. In one embodiment, the FIM 110 may generate the sense/transfer or program operations to the flash 104. FIM 110 interacts with the flash memory 104 by sending flash commands.

The flash management from the flash transformation layer (FTL) 138 may be responsible for internal memory management operations such as address translation. The FTL 138 may also be referred to as the media management layer (MML). The device controller may include a read/write direct memory access (DMA) 310 which may be responsible for transferring data between the host and the device. The command parser 304, queue manager 306, flash management 138 and command executer 308 may be responsible for handling the control path in the device, while the read/write DMA 310 handles the data path in the device. Device firmware 124 may control and manage the functionality of this logic. At the initialization phase, the firmware may configure the device controller 102. During operation, the firmware 124 controls the logic and manages the flash memory 104. The firmware 124 may also assist with the command parsing and queue storage and access.

In one embodiment, command executer 308 may queue sense and transfer requests to the flash commands queue 312. FIM 110 may use this information for sending commands to the flash memory 116. The sense/transfer requests may include other parameters that assist FIM 110. For example, sense requests may include the flash address while transfer requests may include the amount of data to be read from the flash memory 104.

The queueing mechanism described herein may be used within an architecture or protocol that supports queueing, such as protocols that utilize queueing mechanisms. One example of such a memory protocol is Non-Volatile Memory Express (NVMe). NVMe is merely one example of a protocol that utilizes queueing and other protocols are possible. For simplicity, the software queueing described below may refer to NVMe, but may apply to many other protocols or architectures. NVMe may reduce latency and provide faster performance with support for security and end-to-end data protection and provide a flexible architecture for Enterprise and Client platforms. NVMe is merely one example of a host controller interface with a register interface and command set which may be applicable to systems that use Peripheral Component Interconnect Express (PCIe) solid state discs (SSDs). NVMe may include multi-queue based communication with host and controllers writing to submission and completion queues in host memory. NVMe is a submission/completion queue-based protocol where commands are created by the host and placed in a submission queue. A completion queue may signal to the host that the commands have been executed. When a submission command is ready in the submission queue, the device fetches the submission command from the host memory. The submission command may be executed according to its priority defined with an arbitration scheme.

NVMe may be based on a paired submission and completion queue mechanism. Commands are placed by host software into a submission queue. Completions are placed into the associated completion queue by the controller. Submission and completion queues are allocated in host memory. The physical memory locations in host memory which are used for data transfers may be specified using Physical Region Page fixed size (PRP) entries or Scatter Gather List (SGL). PRP is described with respect to FIG. 4 and SGL is described with respect to FIG. 5.

Figure 4:
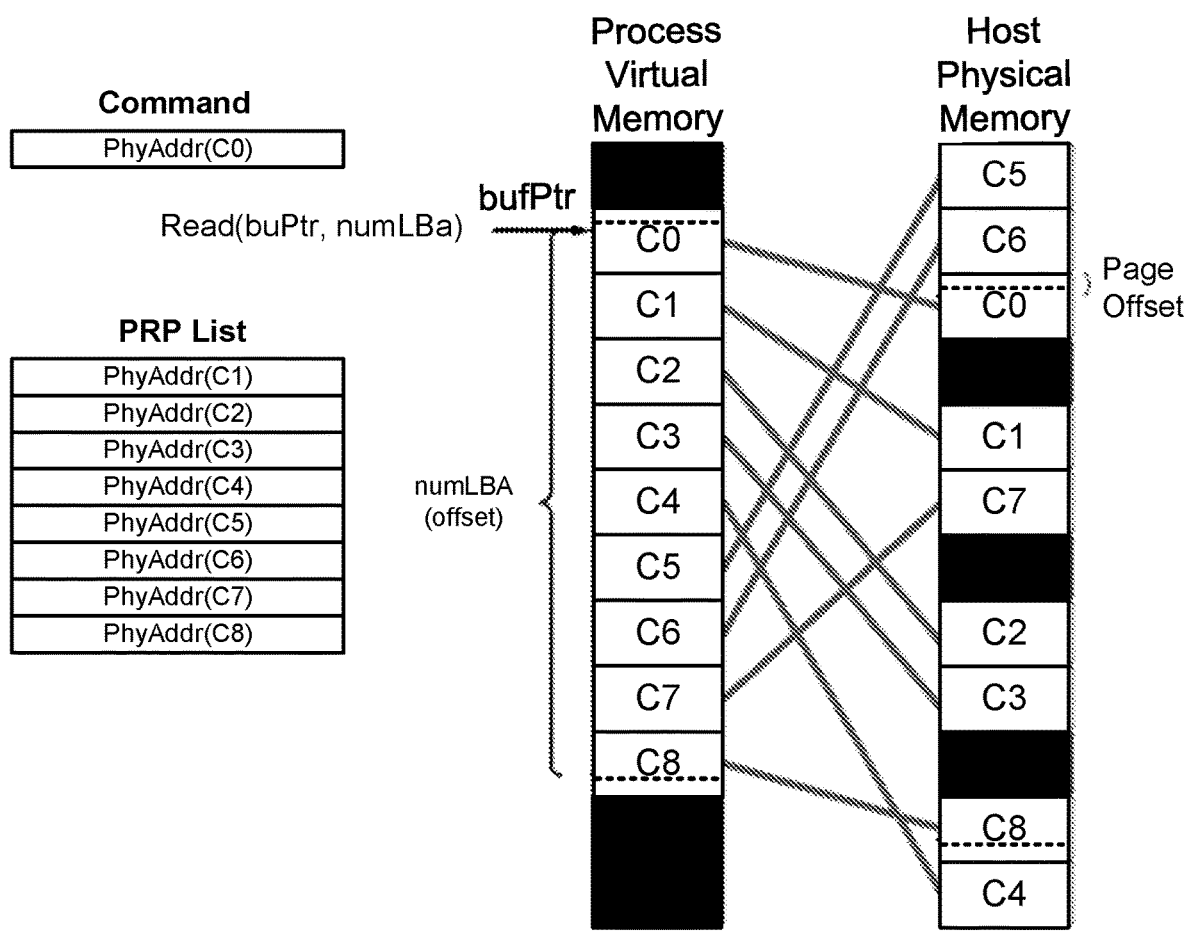
FIG. 4 is a block diagram illustrating Physical Region Page fixed size (PRP) entries.

FIG. 4 is a block diagram illustrating Physical Region Page fixed size (PRP) entries. Each command may include two PRP entries. If more than two PRP entries are necessary to describe the data buffer, then a pointer to a PRP list that describes a list of PRP entries may be provided. The PRP method assumes that each host buffer has the same fixed size besides the first one, as illustrated in FIG. 4. The PRP list maps the host physical memory to a virtual memory (i.e. originally allocated host buffers for a data transfer) as seen by the controller. As described below, the data transfer operation may be simplified when data that is out of order is used. For PRP, the size of each host buffer is fixed, so there is no need to implement a search to find the host physical memory address in the PRP list. For example, if the host buffer size is fixed and the device controller needs to transfer the fourth buffer (C3), the data is located on the third line of the PRP list as shown in FIG. 4.

The command may be a submission command that includes a pointer to the PRP list. The PRP list may include a number of commands. The commands may include a buffer pointer (bufPtr) that points to a buffer in the host memory. An offset identifies where within a buffer, the desired data is located. The size of the buffer is fixed, so the transfer of data (even out of order) may be simplified.

Figure 5:
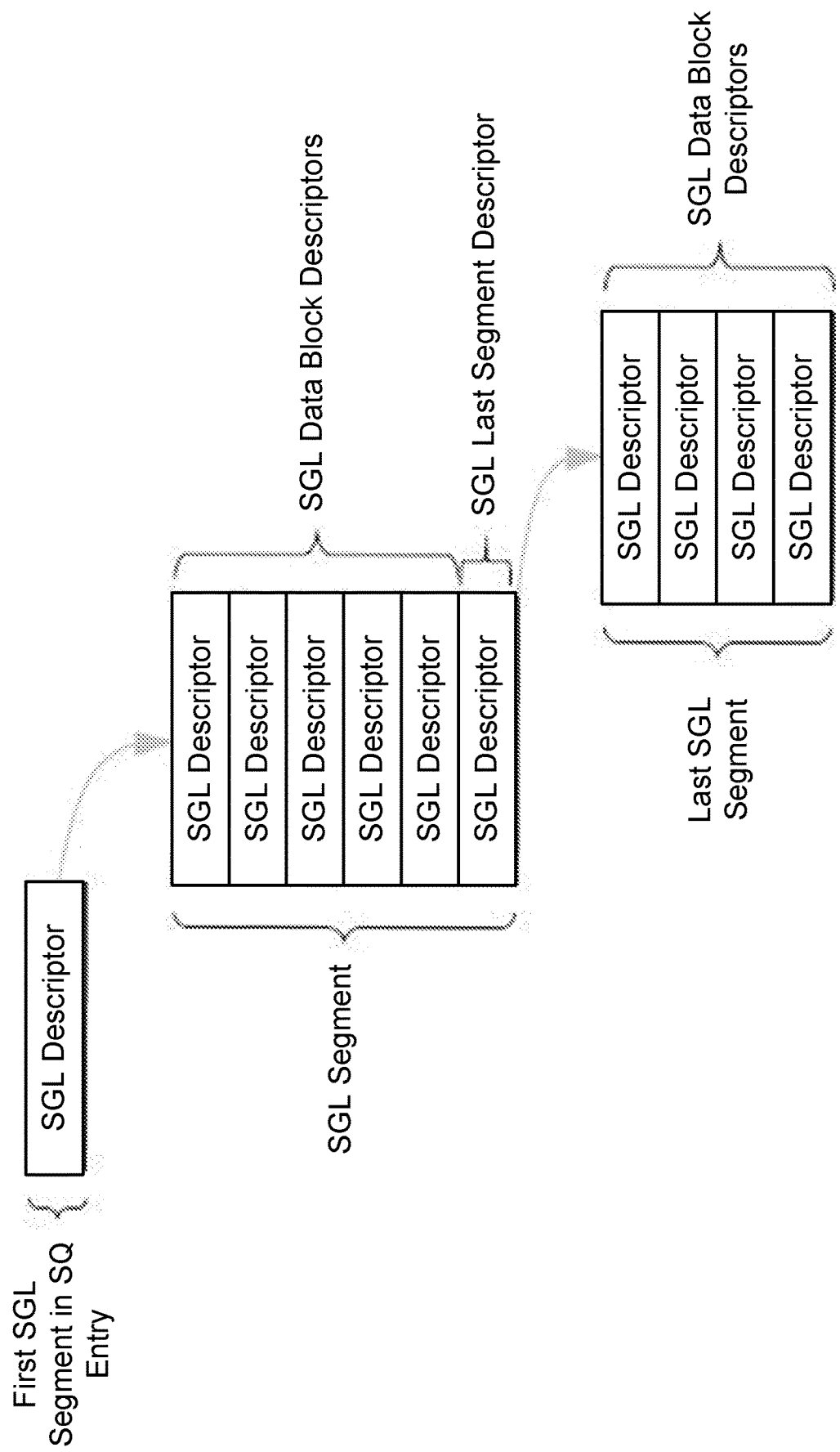
FIG. 5 is a block diagram illustrating Scatter Gather List (SGL).

FIG. 5 is a block diagram illustrating Scatter Gather List (SGL). Although not shown, the size of the host buffers may vary. Each buffer may be described by a dedicated SGL data block descriptor in which the address and the size of the buffer are specified. If more than one SGL segment is necessary to describe the data buffer, then the SGL segment provides a pointer to the next SGL segment.

FIG. 6 illustrates exemplary types of exemplary SGL descriptors. The NVMe standard defines a few types of exemplary SGL descriptors shown in FIG. 6. For example, the SGL data block descriptor may describe a single host buffer. The SGL descriptors may be stored non-continuously in the host memory. Each group of SGL descriptors may be referred to as an SGL segment and described by an SGL segment descriptor. There may be SGL vendor specific descriptors which may be defined in alternate embodiments. When the volatile memory in the device controller is limited, the SGL may be fetched from the host memory before transferring the data and only the relevant information may be fetched rather than pre-fetching the entire SGL list and storing it internally in advance. The code may refer to the hexadecimal value. The SGL Segment and SGL Last Segment may be pointers to the next SGL Segment. The SGL Data Block may include the pointer to the buffer and the size of the buffer.

Referring back to FIG. 5, exemplary SGL usage is shown. The NVMe command contains an SGL segment descriptor which points to a group of SGL data block descriptors. The last descriptor in this group is an SGL last segment descriptor which points to the last group of SGL data block descriptors. Given that the buffers are different sizes, a search for an address of a host buffer to be accessed may require the device controller to walk through the entire SGL descriptor list to find the address. The address search may be required since the size of each host buffer is unknown and can be any value with SGL addressing. The search process may be needed for each transfer of data associated with a command. The address search requires extra traffic on the PCIe bus, which decreases the overall performance and increases the power. In addition, the address search increases the latency. During the time when the device controller waits for the requested SGL descriptors, the host DMA may be blocked since it waits for the host buffer address in order to complete a write to host operation.

Figure 7:
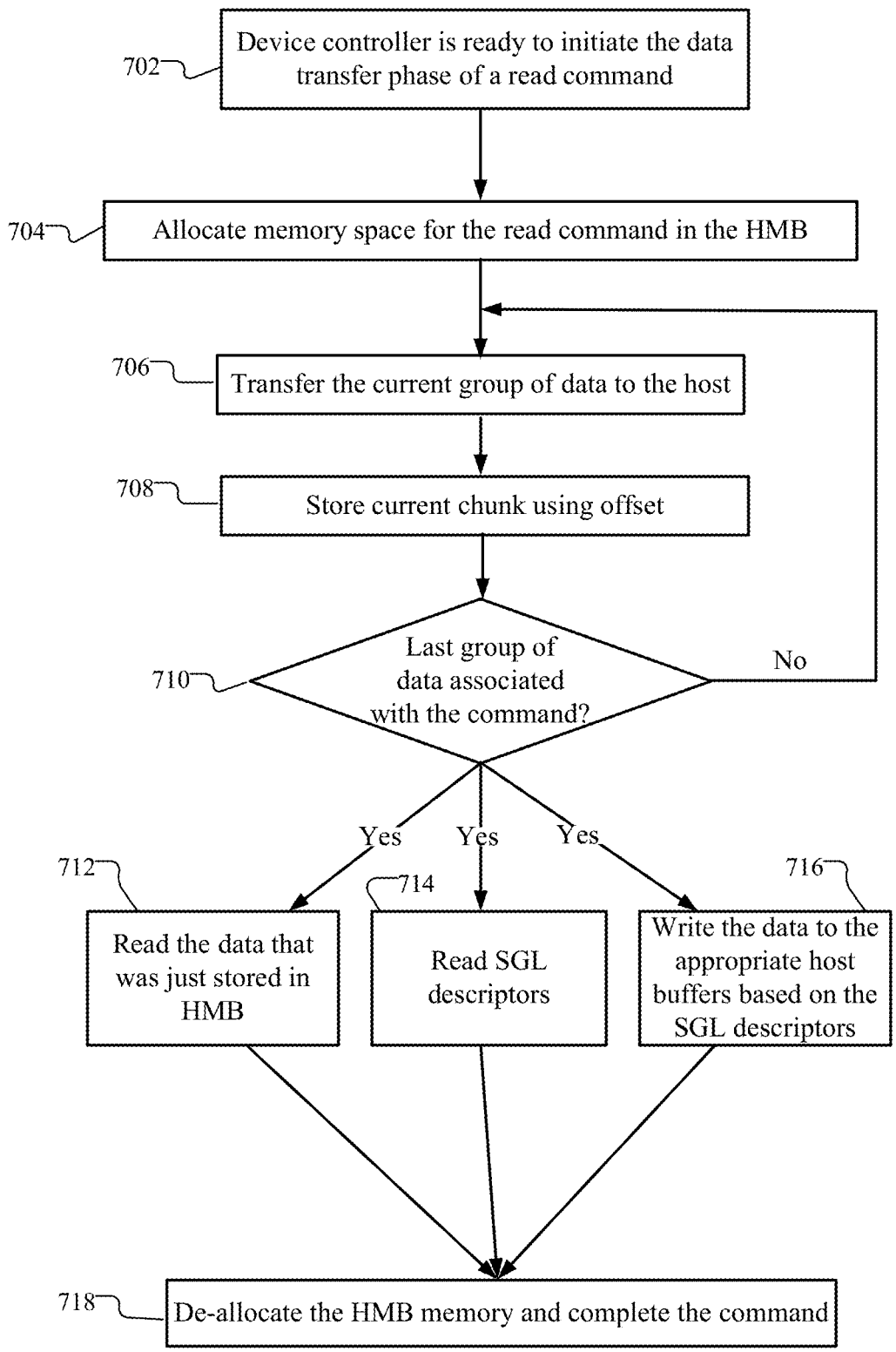
FIG. 7 is a flow chart of the device controller operation.

FIG. 7 is a flow chart of the device controller operation. In particular, FIG. 7 illustrates the proposed NVMe device controller operation when executing a read command. Each read data is written to the HMB, read from the HMB and written again to the appropriate host buffer after the full data is accumulated in the HMB in order. The accumulated data in the HMB is ordered so that the search process is not needed when dealing with the SGL. In one embodiment, the HMB may only be used when the data is out of order and/or when SGL is being used. The efficiency gained by using the HMB is by re-ordering the data that would otherwise be put into the host buffers out of order and difficult to search/address.

In one exemplary embodiment, the data is transferred to and from the HMB. In block 702, the memory device controller initiates a data transfer phase of a read command. The read command may be received from the host. Based on the read command, memory space for the read command is allocated in the HMB in block 704. The allocated size for the HMB may be based on the total transfer size for the read command. Specifically, the allocated size for the HMB may be equal to the total transfer size for the read command. In block 706, a current group or chunk of data is transferred to the host, which includes an offset in the allocated memory. In block 708, the current chunk of data may be stored in the in the appropriate offset in the pre-allocated HMB chunk. For example, when the size of the command is 16 KB and therefore the device allocates 16 KB in HMB with an address of X, the second 4 KB chunk of data is ready first, so the device transfers this chunk and writes it to address X+4 KB in host memory.

In block 710, a check is performed to determine when the last data is received for the allocated HMB. In other words, since the amount allocated for the HMB is known, then once it is full, the data transfer is complete for that command. If the HMB is not full, then the transfer of data to the HMB proceeds. When all the data is available in the HMB, the data is transferred to the appropriate host buffers in blocks 712-716. In block 712, the data is read from the HMB. In block 714, the SGL descriptors are read and the data is written to the originally allocated host buffers based on the SGL descriptors in block 716. The SGL descriptor may identify the correct host buffer. Reading the data from the HMB may be in parallel with reading the SGL list, the SGL descriptor, and with writing the data based on the SGL list to the correct address point. In block 718, the HMB is de-allocated once the data is transferred out.

The host buffers may be described or identified in the SGL descriptors and provided by the command. The host buffer may be a portion of the host physical memory and the host buffer is distinct from the HMB. When the host queues the command to the submission queue, the host expects to get the data on the host buffer that was allocated by the host using the SGL descriptor. However, that data is temporarily passed to the HMB for re-ordering. When the data is read from the HMB it is transferred to the previously allocated host buffer where the host expects to read the data from.

In one embodiment, the memory device may be an NVMe device controller which supports HMB and out of order read data transfers. The device controller dynamically allocates HMB memory for each pending read command while the size of the allocated memory is equal to the size of the entire transfer size of the command. The HMB may be used for storing every group/chunk of data associated with the command at the appropriate location so at the end of the process, the data will be stored in the HMB in order. When the data associated with the host read command is available in the allocated buffer, the device controller fetches the data from the HMB and writes it to the appropriate host buffers which have been allocated by the host using the SGL. The device controller may be configured to wait for the last group/chunk of data accumulated in the HMB and then the data is written to the host buffer from the HMB.

The semiconductor memory elements located within and/or over a substrate may be arranged in two or three dimensions, such as a two dimensional memory structure or a three dimensional memory structure. In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate). As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional exemplary structures described but cover all relevant memory structures within the spirit and scope of the invention as described herein and as understood by one of skill in the art.

In the present application, semiconductor memory devices such as those described in the present application may include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magneto-resistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

A "computer-readable medium," "machine readable medium," "propagated-signal" medium, and/or "signal-bearing medium" may comprise any device that includes, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection "electronic" having one or more wires, a portable magnetic or optical disk, a volatile memory such as a Random Access Memory "RAM", a Read-Only Memory "ROM", an Erasable Programmable Read-Only Memory (EPROM or Flash memory), or an optical fiber. A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory. In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

It is intended that the foregoing detailed description be understood as an illustration of selected forms that the invention can take and not as a definition of the invention. It is only the following claims, including all equivalents that are intended to define the scope of the claimed invention.

Finally, it should be noted that any aspect of any of the preferred embodiments described herein can be used alone or in combination with one another.

We claim:

1. A method for data transfer in a memory device, the method comprising:
   receiving a read command from a host, wherein the read command specifies segments of data to be read from non-volatile memory in the memory device;
   dynamically allocating memory space in a host memory buffer in the host for the read command, wherein a size of the allocated memory space is equal to a total data a transfer size of the read command;
   reading the segments of data from the non-volatile memory in an order different from an order specified in the read command;
   storing the segments of data in the host memory buffer, wherein each segment of data is stored in a location in the host memory buffer that corresponds to a location of the segment of data in the order specified in the read command, wherein even though the segments of data are read out of order from the non-volatile memory, the segments of data are stored in order in the host memory buffer;
   determining whether a last segment of data was read from the non-volatile memory;
   in response to determining that the last segment of data was read from the non-volatile memory, performing the following in parallel:
      reading the segments of data stored in the host memory buffer in the order in which they are stored in the host memory buffer;
      identifying memory locations in a host memory that are designated as a host buffer for data transfers using a scatter gather list (SGL); and
      transferring the segments of data from the host memory buffer to the locations in the host buffer identified in the SGL, wherein the segments of data are transferred in the order in which they are stored in the host memory buffer; and
      de-allocating the memory space in the host memory buffer.

2. The method of claim 1, wherein the host memory buffer is a portion allocated from memory on the host.

3. The method of claim 1, wherein the host buffer is distinct from the host memory buffer.

4. The method of claim 1, wherein the stored segments of data are transferred to a plurality of host buffers of different sizes.

5. The method of claim 1, wherein the host buffer and the host memory buffer are stored in the host.

6. The method of claim 1, wherein each of the plurality of segments of the SGL comprises:
   descriptors that include a pointer; and
   an indication of the size of the host buffer.

7. The method of claim 1, wherein the read commands received from the host reference data that is out of order.

8. The method of claim 7, wherein the data that is out of order is re-ordered by using an offset in the host memory buffer.

9. A host device configured to be connected to a memory device, the host device comprising:
   one or more host buffers;
   a host memory buffer; and
   a controller configured to:

send a read command to a memory device, wherein the read command specifies segments of data to be read from non-volatile memory in the memory device;

store segments of data received from the memory device in the host memory buffer, wherein each segment of data is stored in a location in the host memory buffer that corresponds to a location of the segment of data in the order specified in the read command, wherein even though the segments of data are read out of order from the nonvolatile memory, the segments of data are stored in order in the host memory buffer;

determine whether a last segment of data was stored in the host memory buffer; and in response to determining that the last segment of data was stored in the host memory buffer, perform the following in parallel:

read the segments of data stored in the host memory buffer in the order in which they are stored in the host memory buffer;

identify locations in the one or more host buffers for data transfers using a scatter gather list (SGL); and transfer the segments of data from the host memory buffer to the locations in the one or more host buffers that are identified by the memory device, wherein the segments of data are transferred in the order in which they are stored in the host memory buffer.

10. The host device of claim 9, wherein the memory device utilizes a non-volatile memory express (NVMe) protocol.

11. The host device of claim 10, wherein the host memory buffer is storage in the host device according to the NVMe protocol.

12. A system for data transfer in a memory, the system comprising:

a non-volatile memory;

means for receiving a read command from a host, wherein the read command specifies segments of data to be read from the non-volatile memory;

means for allocating memory space in a host memory buffer for the read command, wherein a size of the allocated memory space is equal to a total data transfer size of the read command;

means for reading the segments of data from the non-volatile memory in an order different from an order specified in the read command;

means for storing the segments of data in the host memory buffer, wherein each segment of data is stored in a location in the host memory buffer that corresponds to a location of the segment of data in the order specified in the read command, wherein even though the segments of data are read out of order from the non-volatile memory, the segments of data are stored in order in the host memory buffer;

means for determining whether a last segment of data was read from the non-volatile memory;

means for, in response to determining that the last segment of data was read from the nonvolatile memory, performing the following in parallel:

reading the segments of data stored in the host memory buffer in the order in which they are stored in the host memory buffer;

identifying memory locations in a host memory that are designated as a host buffer for data transfers using a scatter gather list (SGL); and transferring the segments of data from the host memory buffer to the locations in the host buffer identified in the SGL, wherein the segments of data are transferred in the order in which they are stored in the host memory buffer; and means for de-allocating the memory space in the host memory buffer.

13. The system of claim 12, wherein the host buffer is accessed by the host.

14. The system of claim 12, wherein a size of the host buffer varies based on the read command.

15. The system of claim 12, wherein the host memory buffer and the host buffer are memories in the host.

16. The system of claim 12, wherein the read command received from the host references data that is out of order and is re-ordered with the host memory buffer.

17. The method of claim 1, wherein the non-volatile memory comprises a three-dimensional memory.

18. The host device of claim 9, wherein the non-volatile memory comprises a three-dimensional memory.

19. The host device of claim 9, wherein the memory device is embedded in the host device.

20. The system of claim 12, wherein the non-volatile memory comprises a three-dimensional memory.

* * * * *